March 6, 1962 E. E. ISGREN ET AL 3,024,378
INDUCTION MOTOR ROTOR
Filed April 11, 1958 2 Sheets-Sheet 1

INVENTORS:
ELMER E. ISGREN
CHARLES C. ROE
BY John F. Schmidt

March 6, 1962 E. E. ISGREN ET AL 3,024,378
INDUCTION MOTOR ROTOR
Filed April 11, 1958 2 Sheets-Sheet 2

INVENTORS:
ELMER E. ISGREN
CHARLES C. ROE
BY
John F. Schmidt

United States Patent Office 3,024,378
Patented Mar. 6, 1962

3,024,378
INDUCTION MOTOR ROTOR
Elmer E. Isgren, Peoria, and Charles C. Roe, East Peoria, Ill., assignors to LeTourneau-Westinghouse Company, Peoria, Ill., a corporation of Illinois
Filed Apr. 11, 1958, Ser. No. 727,893
9 Claims. (Cl. 310—211)

This invention relates to an electric motor rotor, more particularly to a rotor for an alternating current motor of the induction type, and is an improvement in the invention disclosed and claimed in Patent 2,517,002 to R. G. LeTourneau, issued August 1, 1950.

Electric motors made according to LeTourneau Patent 2,517,002 are subjected in operation to a great many reversals at very high torques. The long portion of the conductor bars extending beyond the lamination stack is supported in said LeTourneau patent by the resistance end bell. Under the many reversals to which such a motor is subjected in use, it has been found that the rotor structure of the LeTourneau patent is inadequate to support the outboard ends of the conductor bars. To some extent, this is doubtless due to the slotted structure of the end bell which weakens the bell to the extent that the high interia forces of the heavy copper bars and the heavy end bell itself have to be absorbed by the copper bars and the portion of the end bell between the slots with the result that fatigue failures of the bars and of the end bell takes place.

It is an object of this invention to provide an induction motor rotor structure of a type somewhat similar to that disclosed in the LeTourneau patent but having greatly improved resistance to fatigue failure and having better cooling facilities for the rotor structure. This and other objects are accomplished by a structure which is shown in drawings appended hereto and described herein.

Figure 1:
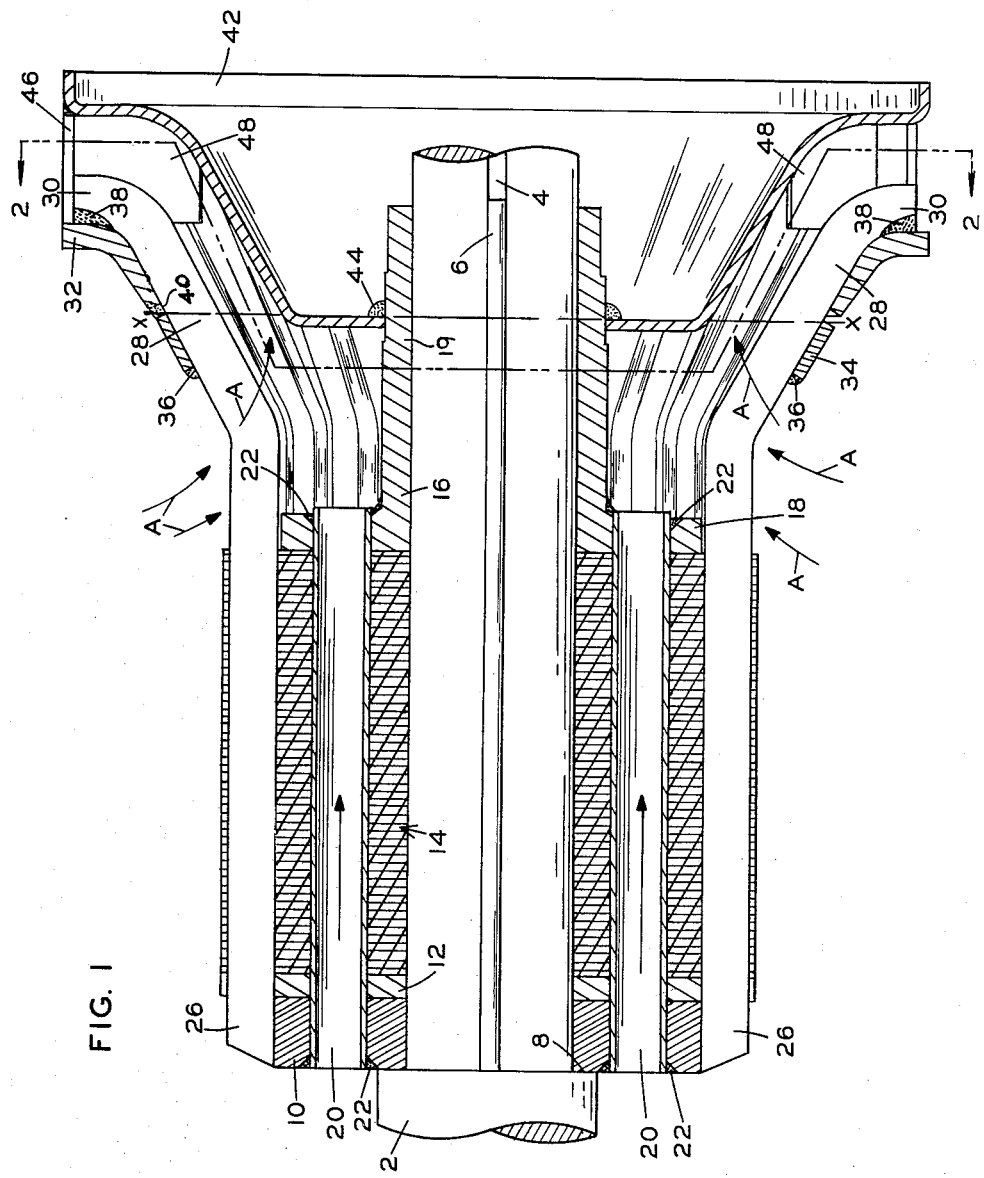
FIG. 1 is a longitudinal sectional view of a motor rotor made according to one embodiment of this invention and being a view in section substantially on line 1—1 of FIG. 2.
Figure 2:
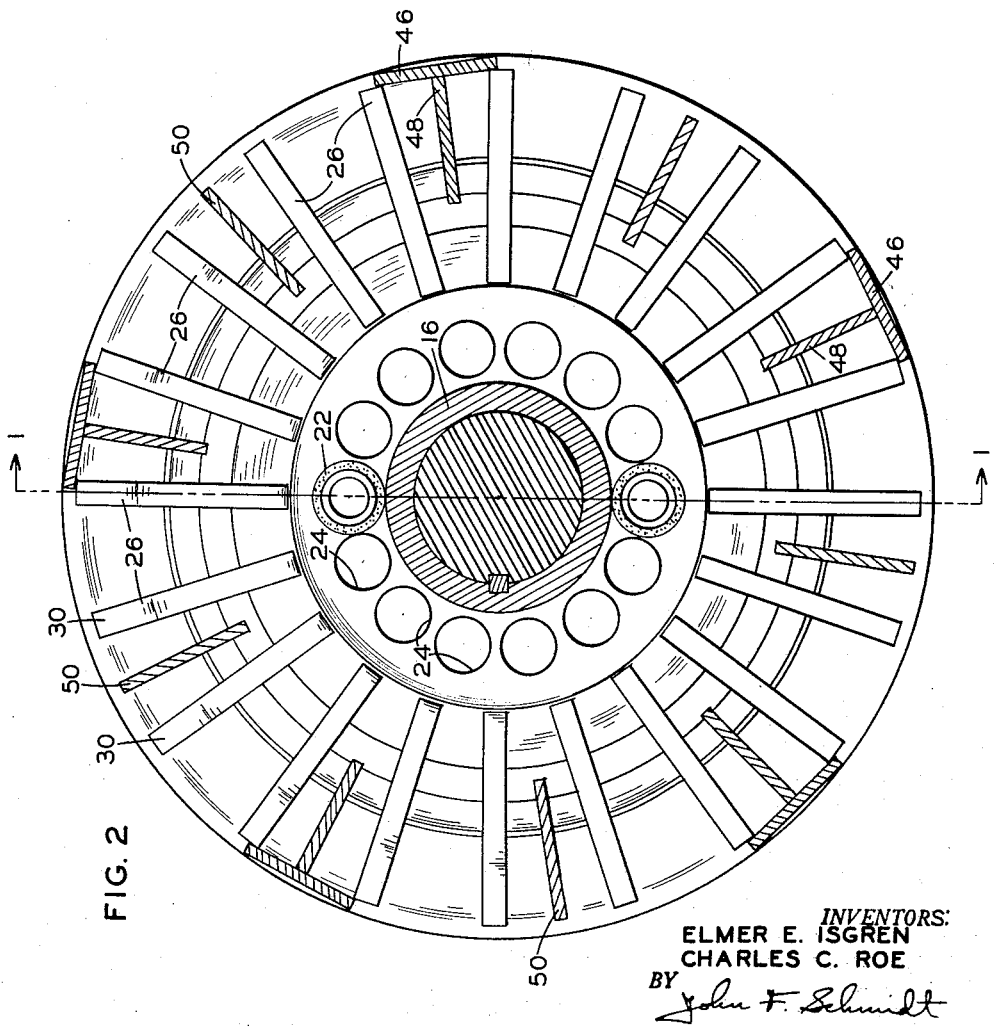
FIG. 2 is a view in section substantially on line 2—2 of FIG. 1.

Referring now specifically to the embodiment of the invention shown in FIGS. 1 and 2, a shaft 2 is shown and it will be understood by those skilled in the art that this shaft is mounted for rotation in suitable bearings. In fact, the shaft 2 is preferably the same as or similar to the shaft shown in the LeTourneau patent referred to, inasmuch as the rotor unit exclusive of the shaft is in many cases interchangeable with the rotor unit shown in the LeTourneau patent referred to. The shaft 2 is provided with a keyway 4 to receive a key 6 by which the removable rotor unit is secured against rotation relative to the shaft.

Shaft 2 is preferably of two diameters to form a shoulder 8 against which an end member or plate 10 rests. A conductor ring 12 is disposed adjacent the end member 10. A lamination stack indicated generally at 14 is preferably disposed adjacent the conductor ring 12. The lamination stack 14 is of course of a high permeability steel the composition of which need not be detailed here. A second end member 16 is disposed at the opposite end of the lamination stack 14, second end member 16 being provided with a radial portion 18 and an axial portion 19.

End member 10, conductor ring 12, the lamination stack 14, and hub 16 are tightly clamped together by any suitable means, preferably by a plurality of members extending through holes in these elements and welded at their ends to the outermost elements. In the embodiment shown, two tubular clamping members 20 extend through all of elements 10, 12, 14, and 16 and are welded at their ends to the plate 10 and radial portion 18, as shown at 22. The hollow clamping members 20 cooperate with other similar passages 24 to permit the passage of a cooling fluid through the rotor structure.

Conductor ring 12 and the lamination stack 14 are provided with a plurality of circumferentially spaced slots which are preferably parallel with the axis of shaft 2. The provision of such slots is entirely conventional and need not be described in detail here. A plurality of conductor bars 26 equal in number to the slots are placed in the slots and are securely welded to the conductor ring 12.

It can thus be seen that the circumferentially spaced conductor bars 26 are supported on the shaft throughout a substantial portion of their length by means of the high permeability section or lamination stack 14, and of course also by means of end member 10 and conductor ring 12. As is best seen in FIG. 1, the conductor bars 26 have ends 28 which extend a substantial distance beyond one end of the high permeability section 14. In a preferred embodiment of the invention, these ends 28 are turned radially outward as shown at 30. A resistance ring 32 which corresponds to the resistance end bell of the LeTourneau patent is secured to the ends of the unsupported portions 28 of the conductor bars. In some embodiments of the invention, it will be found desirable to add a torque ring 34. Each of torque ring 34 and resistance ring 32 is secured as by welding to each of the conductor bars, as shown for example at 36 and at 38. In addition, torque ring 34 and resistance ring 32 are preferably welded to each other, either continuously or, alternatively, at intervals as shown at 40.

The foregoing description states that the ends 28 of bars 26 extend a "substantial" distance beyond one end of section 14. By this it is meant that enough of each conductor bar is unsupported to make the bending stresses due to acceleration high enough to require that the designer take these stresses into consideration.

A support member 42 is secured on the shaft non-rotatively with respect thereto by means of second end member 16, to axial portion 19 of which it is preferably welded as shown at 44 in a plane X—X which is axially spaced from radial portion 18, thus disposing the plane of support much closer to the radially outward extremities 30 of outboard ends 28 than is possible when the inner end of such a support is disposed immediately adjacent the end of the high permeability section as in LeTourneau Patent 2,517,002, supra. Note that support member 42 has the same general configuration as the ends 28—30 of the conductor bars, and is spaced from the resistance ring 32 with the turned-outward ends 30 of the conductor bars lying between resistance ring 32 and support member 42. Means are provided to secure the resistance ring 32 and support member 42 against rotation relative to each other, these means taking the form of a plurality of circumferentially spaced gussets 46. In the embodiment shown in FIGS. 1 and 2, the means to secure the two elements 32 and 42 against relative rotation and which help to space them apart include members 48, which together with the gussets 46, form a spacer member which is T shaped in cross section as seen in FIG. 2.

In addition, the space between resistance ring 32 and support member 42 is provided with means which form fluid pump elements, these means taking the shape of vanes 50 which may be secured to one or both of the elements 32 and 42. It will of course add stiffness to the structure to weld the vanes 50 securely to both elements.

Reference will now be made to the embodiment of the invention shown in FIG. 3. In that embodiment, the axial space between resistance ring 232 and support member 242 is substantially reduced. The space is reduced to the point that vane elements 50 can if desired be omitted from this embodiment, in which case the conductor bar ends 230 serve to provide the pumping action. It may be noted that the axial distance is not reduced to the extent that support member 242 actually contacts the conductor bar ends 230. Even so, it will of course be understood by those skilled in the art that gussets similar to those shown at 46 in the first embodiment may be and preferably are used to hold the resistance ring 232 and the support member 242 against relative rotation. Such a gusset is shown at 246. It will of course be understood that a number of such gussets will be spaced about the periphery but that these will not be sufficient in number to interfere to any great extent with the gas pump action.

With the support member 242 not actually touching the ends of the conductor bars, the support member 242 does not serve as a full conductor ring. However, in view of the electrical connection that is established by the gussets 246, there will of course be some current conduction by the support member 242.

Figure 4:
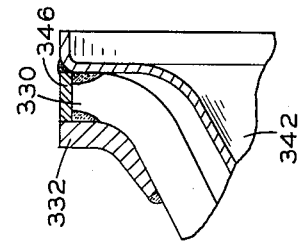
FIG. 4 is a view similar to FIG. 3 but showing still another embodiment of the invention.

FIG. 4 shows still another embodiment of the invention. In this embodiment, the axial distance between resistance ring 332 and support member 342 is reduced to the extent that support member 342 is actually in contact with the ends 330 of the conductor bars. In this embodiment, support member 342 becomes a full conductor ring and its electrical characteristics must be taken carefully into account. In the embodiment shown in this figure, for many applications it will be found possible and desirable to eliminate the gussets securing the resistance ring and the support member against relative rotation. However, if additional stiffening is deemed desirable or necessary, such gussets may be used, and one of these is shown at 346.

*Operation*

As the rotor unit shown in FIG. 1 is subjected to high torque reversals, the inertia of the unsupported portions 28 of conductor bars 26 tries to make cantilever beams out of these members, and this action is accentuated by the weight of the resistance ring 32. However, such deflection of the conductor bar portions 28 is prevented by the support member 42 in view of its connection with the shaft 2 by way of second end member 16 and also because of its rigid connection with resistance ring 32. Thus, bending of the conductor bars is effectively prevented and fatigue failure of the bars which would otherwise arise is likewise prevented.

At the same time that support member 42 effectively prevents bending of the conductor bars, the rapid rotation of the rotor unit along with the action of vanes 50 provides a pumping action which draws cooling fluid through the bores 24 and through the tubular members 20, as shown by the arrows in the tubular members 20 in FIG. 1. This flow of cooling fluid serves to keep the high permeability section of the rotor unit within the limits of operating temperatures.

Some of the heating of the high permeability section is due to conduction through the conductor bars 26 back from the very hot resistance ring 32. To a considerable extent, such heating of the section 14 is prevented by air flow radially inward between the conductor bars in their unsupported region, as shown by the arrows A, FIG. 1.

The torque ring 34 is preferably of the same material (stainless steel) as resistance ring 32. Torque ring 34 gives strength to the structure such as to prevent excessive radial stresses in the conductor bars due to centrifugal force. In addition the torque ring 34 minimizes torsional flexing of the conductor bars caused by the many speed changes.

Figure 3:
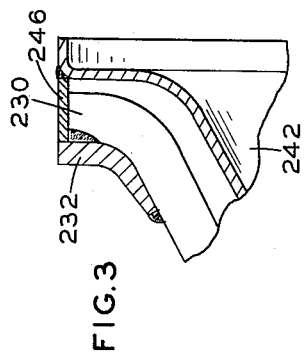
FIG. 3 shows another embodiment of a motor made according to this invention and is a longitudinal sectional view similar to that of FIG. 1 but showing only that portion of the rotor structure which differs from the embodiment shown in FIG. 1.

The operation of the embodiments shown in FIGS. 3 and 4 will be apparent to those skilled in the art from the description of the operation of the embodiment shown in FIGS. 1 and 2.

It will be apparent from the foregoing that this invention provides an induction motor rotor having greater strength and better cooling properties than the rotor shown in LeTourneau Patent 2,517,002, referred to above.

While there are in this application specifically described three forms which the invention may assume in practice, it will be understood that these forms of the same are shown for the purpose of illustration, and that the invention may be modified and embodied in various other forms without departing from the spirit and scope of the invention as set forth in the appended claims.

What is claimed is:

1. An induction rotor unit comprising a shaft, a plurality of circumferentially spaced conductor bars supported on the shaft throughout a substantial portion of their length and having ends extending a substantial distance beyond the supported portion, a resistance ring secured to said ends, a support member secured on the shaft and spaced from the resistance ring to form with it conduit means for the flow of cooling fluid, and means securing the resistance ring and the support member against relative rotation.

2. A rotor unit as in claim 1, and means cooperating with the support member to form a pump for cooling fluid.

3. An induction rotor unit comprising a shaft, a plurality of circumferentially spaced conductor bars supported on the shaft throughout a substantial portion of their length and having ends extending a substantial distance beyond the supported portion, a resistance ring secured to said ends, a support member secured on the shaft and spaced from the resistance ring, means between the support member and the resistance ring forming fluid pump elements, and means securing the resistance ring and the support member against relative rotation.

4. An induction rotor unit comprising a plurality of circumferentially spaced conductor bars adapted to be supported on a shaft throughout a substantial portion of their length and having ends extending a substantial distance beyond the supported portion, said ends being turned radially outward, a resistance ring secured to said turned-outward ends, a support member secured on the shaft and spaced from the resistance ring with the conductor bar ends between the ring and the support member, and means securing the resistance ring and the support member against relative rotation.

5. An induction motor rotor comprising a high permeability section adapted to receive a motor shaft, spaced conductor bars supported by the high permeability section adjacent the periphery thereof and having ends extending a substantial distance beyond one end of the high permeability section, spaced passages for cooling fluid in the high permeability section and radially inward from said bars, a resistance ring secured to said extending ends, an end member closely adjacent to the high permeability section at the end opposite the extending ends, a second end member opposite the first-named end member and having a radial portion closely adjacent to the high permeability section and an axial portion, means passing through at least two of said cooling passages and engaging the first-named end member and the radial portion to hold the end members and the high permeability section in assembled relation, a support member secured to the axial portion of the second end member in a plane axially spaced from the radial portion of the second end member, and means securing the resistance ring and the support member against relative rotation, whereby the support member supports said extending ends of the conductor bars.

6. An induction motor rotor comprising a high permeability section adapted to receive a motor shaft, spaced conductor bars supported by the high permeability section adjacent the periphery thereof and having ends extending a substantial distance beyond one end of the high permeability section, spaced passages for cooling fluid in the high permeability section and radially inward from said bars, a resistance ring secured to said extending ends, an end member closely adjacent to the high permeability section at the end opposite the extending ends, a second end member opposite the first named end member and having a radial portion closely adjacent to the high permeability section and an axial portion, a support member secured to the axial portion of the second end member in a plane axially spaced from the radial portion of the second end member, and means securing the resistance ring and the support member against relative rotation, whereby the support member supports said extending ends of the conductor bars.

7. An induction motor rotor comprising a high permeability section adapted to receive a motor shaft, spaced conductor bars supported by the high permeability section adjacent the periphery thereof and having ends extending a substantial distance beyond one end of the high permeability section, a resistance ring secured to said extending ends, an end member closely adjacent to the high permeability section at the end opposite the extending ends, a second end member opposite the first-named end member and having a radial portion closely adjacent to the high permeability section and an axial portion, a support member secured to the axial portion of the second end member in a plane axially spaced from the radial portion of the second end member, and means securing the resistance ring and the support member against relative rotation, whereby the support member supports said extending ends of the conductor bars.

8. An induction motor rotor comprising: a high permeability section adapted to receive a motor shaft; spaced conductor bars supported by the high permeability section adjacent the periphery thereof and having ends extending a substantial distance beyond one end of the high permeability section; a resistance ring secured to said extending ends; an end member closely adjacent to the high permeability section at the end opposite the extending ends; a second end member opposite the first named end member and having a radial portion closely adjacent to the high permeability section and an axial portion; spaced passages for cooling fluid, each such passage including the first-named end member, the high permeability section, and the radial portion of the second end member; a support member secured to the axial portion of the second end member in a plane axially spaced from the radial portion of the second end member; and means securing the resistance ring and the support member against relative rotation.

9. A rotor as in claim 8, in which the last-named means includes fluid pump elements.

References Cited in the file of this patent

UNITED STATES PATENTS

| | | |
|---|---|---|
| 872,708 | Behrend | Dec. 3, 1907 |
| 920,798 | Wiard | May 4, 1909 |
| 1,685,677 | Maxwell | Sept. 25, 1928 |
| 2,531,225 | LeTourneau | Nov. 21, 1950 |

FOREIGN PATENTS

| | | |
|---|---|---|
| 545,170 | Germany | Feb. 26, 1932 |